United States Patent
Kurihara

(10) Patent No.: US 8,139,248 B2
(45) Date of Patent: Mar. 20, 2012

(54) INFORMATION DISTRIBUTION SYSTEM, ITS DISTRIBUTION CENTER APPARATUS AND USER TERMINAL APPARATUS, AND INFORMATION STORAGE MEDIUM USABLE FOR THE SYSTEM

(75) Inventor: Shinichi Kurihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1231 days.

(21) Appl. No.: 11/808,075

(22) Filed: Jun. 6, 2007

(65) Prior Publication Data

US 2007/0291305 A1    Dec. 20, 2007

(30) Foreign Application Priority Data

Jun. 8, 2006  (JP) ................................. 2006-160039
May 28, 2007  (JP) ................................. 2007-140064

(51) Int. Cl.
  *G06F 3/12* (2006.01)
  *G06K 15/00* (2006.01)
(52) U.S. Cl. ...................... 358/1.15; 358/1.16
(58) Field of Classification Search .................. 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| | | | |
|---|---|---|---|
| 6,329,035 B1 | 12/2001 | Iwasaki et al. | |
| 6,956,010 B2 | 10/2005 | Tsukida et al. | |
| 2003/0072908 A1 | 4/2003 | Anderson | |
| 2003/0214670 A1 | 11/2003 | Ohmura | |
| 2004/0145989 A1 | 7/2004 | Kusunoki et al. | |
| 2005/0000657 A1 | 1/2005 | Bronson | |
| 2005/0021774 A1* | 1/2005 | Kurihara et al. | 709/228 |
| 2005/0171913 A1 | 8/2005 | Kurihara et al. | |
| 2008/0152412 A1 | 6/2008 | Shoji et al. | |

FOREIGN PATENT DOCUMENTS

| | | |
|---|---|---|
| GB | 2401965 A | 11/2004 |
| GB | 2408605 A | 6/2005 |
| JP | 09-282838 | 10/1997 |
| JP | 10-188454 | 7/1998 |
| JP | 11096728 A | 4/1999 |
| JP | 2000-156037 | 6/2000 |
| JP | 200260161 A | 9/2000 |

(Continued)

OTHER PUBLICATIONS

Notification for Filing Opinion from the Korean Intellectual Property Office for Application No. 10-2007-0055013, dated May 27, 2008.

(Continued)

*Primary Examiner* — Thierry Pham
(74) *Attorney, Agent, or Firm* — Finnegan, Henderson, Farabow, Garrett & Dunner, L.L.P.

(57) ABSTRACT

When distributing an encrypted content to a user terminal apparatus via a communication line, a distribution center apparatus requires a medium ID of an information storage medium, and encrypts a decryption key of the encrypted content by using the corresponding medium ID to transmit the encrypted decryption key to the terminal apparatus. The terminal apparatus downloads to store the encrypted content, receives the encrypted key to decrypt it in the use of the medium ID of the storage medium and to decrypt the encrypted content by using the decryption key. In such a system, the center apparatus provides print information corresponding to view conditions of a distributed content to the terminal apparatus in response to the request therefrom, and the terminal apparatus makes the print information appropriately printable by means of a printer.

18 Claims, 4 Drawing Sheets

FOREIGN PATENT DOCUMENTS

| | | |
|---|---|---|
| JP | 2001-189021 | 7/2001 |
| JP | 2001-344765 | 12/2001 |
| JP | 2002-230320 | 8/2002 |
| JP | 2004-021652 | 1/2004 |
| JP | 2004-350150 | 12/2004 |
| JP | 2005-159752 | 6/2005 |
| JP | 2005-235359 | 9/2005 |
| JP | 2005-310240 | 11/2005 |
| JP | 2006-127562 | 5/2006 |
| KR | 1998-32060 | 7/1998 |
| KR | 10-2006-0002821 | 1/2006 |
| KR | 10-2006-0058047 | 5/2006 |
| WO | WO 2005/122149 A1 | 12/2005 |
| WO | WO 2006/070622 A1 | 7/2006 |
| WO | WO 2007/044092 A1 | 4/2007 |

OTHER PUBLICATIONS

English translation of Notification of Reasons for Rejection from the Japanese Patent Office for Application No. 2007-140064, dated Jul. 4, 2008 (3 pages).

Notification for Filing Opinion issued in the Korean Patent Office for Application No. 10-2008-0073575, dated Oct. 20, 2008, with English translation(7 pages).

Decision of Rejection issued by the Japanese Patent Office for application No. 2008-230111 on Aug. 17, 2010, and English translation attached (4 pages).

Notice of Reasons for Rejection issued by the Japanese Patent Office on Apr. 13, 2010, for Japanese Patent Application No. 2008-230111, and English-language translation thereof.

Combined Search and Examination Report from the United Kingdom Intellectual Property Office for Application No. GB 0711082.8, dated Oct. 9, 2007.

Combined Search and Examination Report from the United Kingdom Intellectual Property Office for Application No. GB 0814593.0, dated Nov. 4, 2008 (6 pages).

Office Action mailed by the Canadian Patent Office on Nov. 23, 2011, for Canadian Application No. 2,591,174 (4 pages).

\* cited by examiner

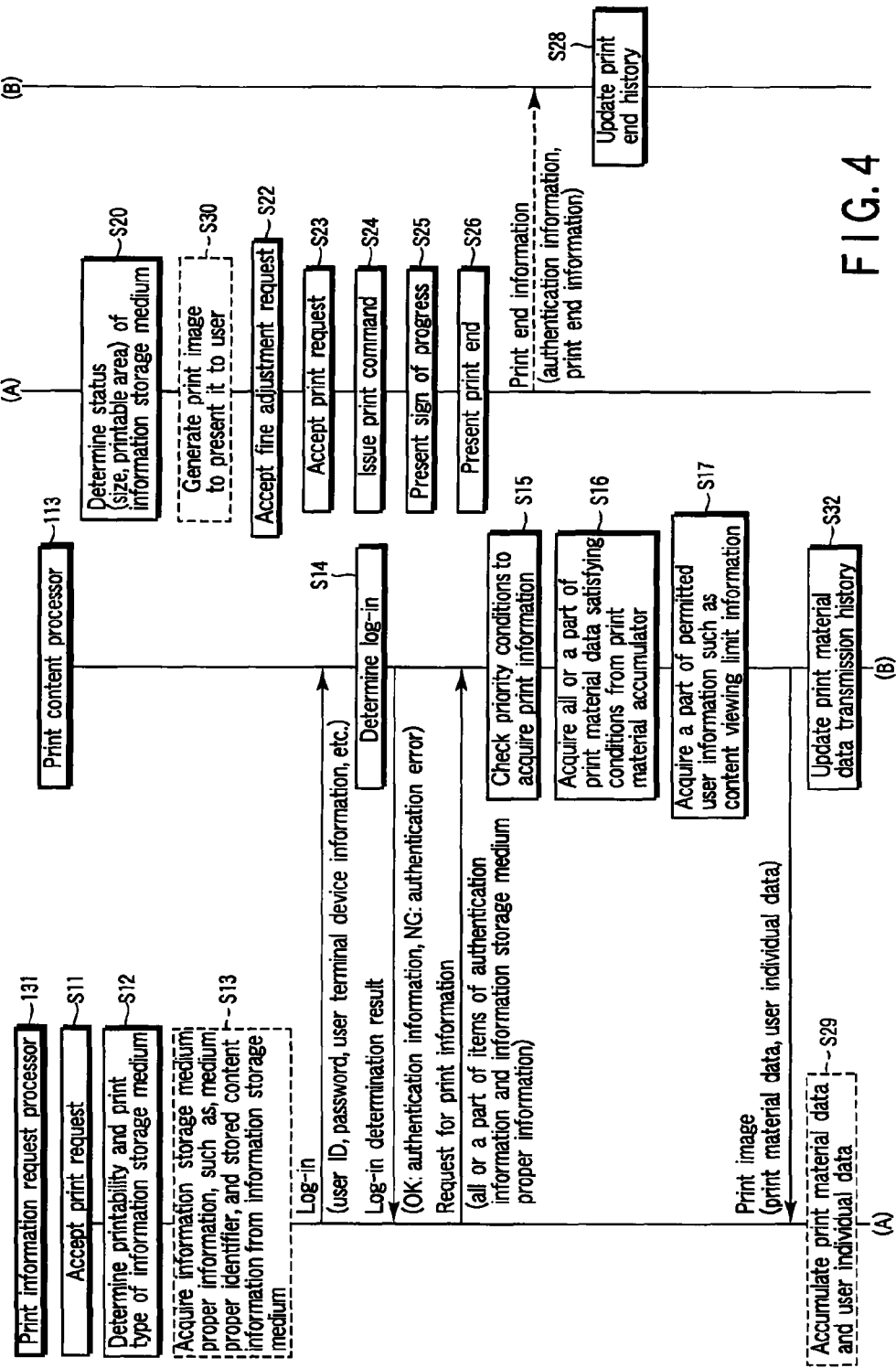
F I G. 4

INFORMATION DISTRIBUTION SYSTEM, ITS DISTRIBUTION CENTER APPARATUS AND USER TERMINAL APPARATUS, AND INFORMATION STORAGE MEDIUM USABLE FOR THE SYSTEM

CROSS-REFERENCE TO RELATED APPLICATIONS

This application is based upon and claims the benefit of priority from prior Japanese Patent Applications No. 2006-160039, filed Jun. 8, 2006; and No. 2007-140064, filed May 28, 2007, the entire contents of both of which are incorporated herein by reference.

BACKGROUND OF THE INVENTION

1. Field of the Invention

The present invention relates to an information distribution system capable of presenting a contract content, etc., of information to be distributed from a distribution center apparatus on a side of a user terminal apparatus, and its distribution center apparatus and user terminal apparatus, and an information storage medium usable for the system.

2. Description of the Related Art

In recent years, services to distribute electronic data in the use of a communication line have become popular with the spread of broadband. Some of them have started to provide services only through a specific information storage medium for which a contract between a user and a distributor is made. In such services, to prevent duplicating of distribution information, a method, which encrypts the distribution information by using proper information, such as a medium ID written into a read only area in the information storage medium, has been employed.

One of the method provides a service to distribute a video content in use of the information storage medium corresponding to content protection for recordable media (CPRM) in the field of a video distribution service (refer to, for example, JP-A 2004-350150 (KOKAI) and JP-A 2005-159752 (KOKAI)).

In distributing the video content, the service encrypts it with a prescribed key and encrypts to distribute a key for decrypting, with a medium ID of the storage medium, the video content distributed in a view request. Therefore, the user who does not have a medium with its ID cannot decrypt the key. Thereby, the method can surely prevent illegal use of duplicate and has an advantage excellent in copyright protection, even if the video content has been duplicated without permission, because the information storage medium corresponding to the CPRM having the medium ID used for encrypting the key is required to obtain the key to decrypt the encryption. The system regarding the method being capable of downloading the video content to store it in a storage medium, it may select any one of the storage medium of a purchase type capable of viewing indefinitely or a rental type capable of viewing within a given period of time like a commercially available DVD package.

Meanwhile, when viewing the video content associated with the information storage medium by using a communication line, the information distribution system given above presents identification information for a video content and management information, such as a view time period, possible to view through the information storage medium in response to a request from a user. As to a method of the presentation, for instance, storing the management information in an inner memory of a user terminal apparatus, or the information storage medium itself to read and display the management information from a storage area when the information storage medium is set, or to access to a distribution center to acquire and display the management information included in user information managed on the side of the distribution center is a generic approach.

However, in such a presentation method, an increase in the number of media to be used poses the need of replacement and setting of each medium for the user terminal apparatus and it results in troublesome work for the user. Therefore, to identify the management information, the user has to make a print or a handwritten note on the user's own terms.

In distributing information content from the distribution center apparatus, the aforementioned system transmits transmission information of matters for attention and limitations or the like to the user terminal apparatus to present it to the user in the use of a display function on the side of the user terminal apparatus. Therefore, to confirm the transmission information for the distribution of the video content, troublesome processing is required for the user terminal apparatus to set the information storage medium to access to the distribution center apparatus, and for the distribution center apparatus to acquire the necessary transmission information from user information managed on the side of the center apparatus.

BRIEF SUMMARY OF THE INVENTION

An object of the present invention is to provide an information distribution system configured to automatically store management information and transmission information presented when a distribution center apparatus distributes information data and configured to visually present them on a side of a user terminal apparatus, its distribution center apparatus and user terminal apparatus, and an information storage medium usable for the system.

The information distribution system regarding the invention is configured to distribute information data to a user terminal apparatus from a distribution center apparatus via a communication line, wherein the distribution center apparatus separately manages to each store information data encrypted with a prescribed key and the key in advance, distributes information data required from the user terminal apparatus in an encrypted state, requires to the user terminal apparatus to present medium proper identification information stored in an information storage medium having proper identification information, and encrypts to distribute the key itself used for encrypting the information data by using the medium proper identification information presented in response to the request, and the distribution center apparatus comprises: a user management unit which generates and registers user individual management information including use conditions of distributed information data by associating it with user information registered in advance; a material data accumulator which accumulates material data to print information related to the information data onto a label print surface of the information storage medium; a request accepting unit which accepts a request for print information for the distributed information data to be transmitted from the user terminal apparatus together with the medium proper identification information; a image generation unit which reads the user individual management information from the user management unit as well as reads the corresponding material data from the material data accumulator in accepting the request for the print information to generate a print image in a prescribed form; and a transmitting unit which transmits the print image to the user terminal apparatus at a request source of the print information, and wherein the user terminal apparatus decrypts an encrypted key received from the distribution center apparatus by using the medium proper identification information presented to the distribution center apparatus, and decrypts the encryption of the distributed information data with the decrypted key, and the user terminal apparatus comprises: a communication unit which transmits, to the distribution center apparatus, the request for the print information of the distributed information data together with the medium proper identification information, and receives the print image to be transmitted from the distribution center apparatus; an accumulator which accumulates the print image received by the communication unit; and a print unit which prints the print image onto a label print surface of the information storage medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

FIG. 4 is an exemplary sequence view illustrating a flow of an information distribution system depicted in FIG. 3.

DETAILED DESCRIPTION OF THE INVENTION

Embodiments of the present invention will be set forth in the description which follows with reference to the drawings in detail.

First Embodiment

Figure 1:
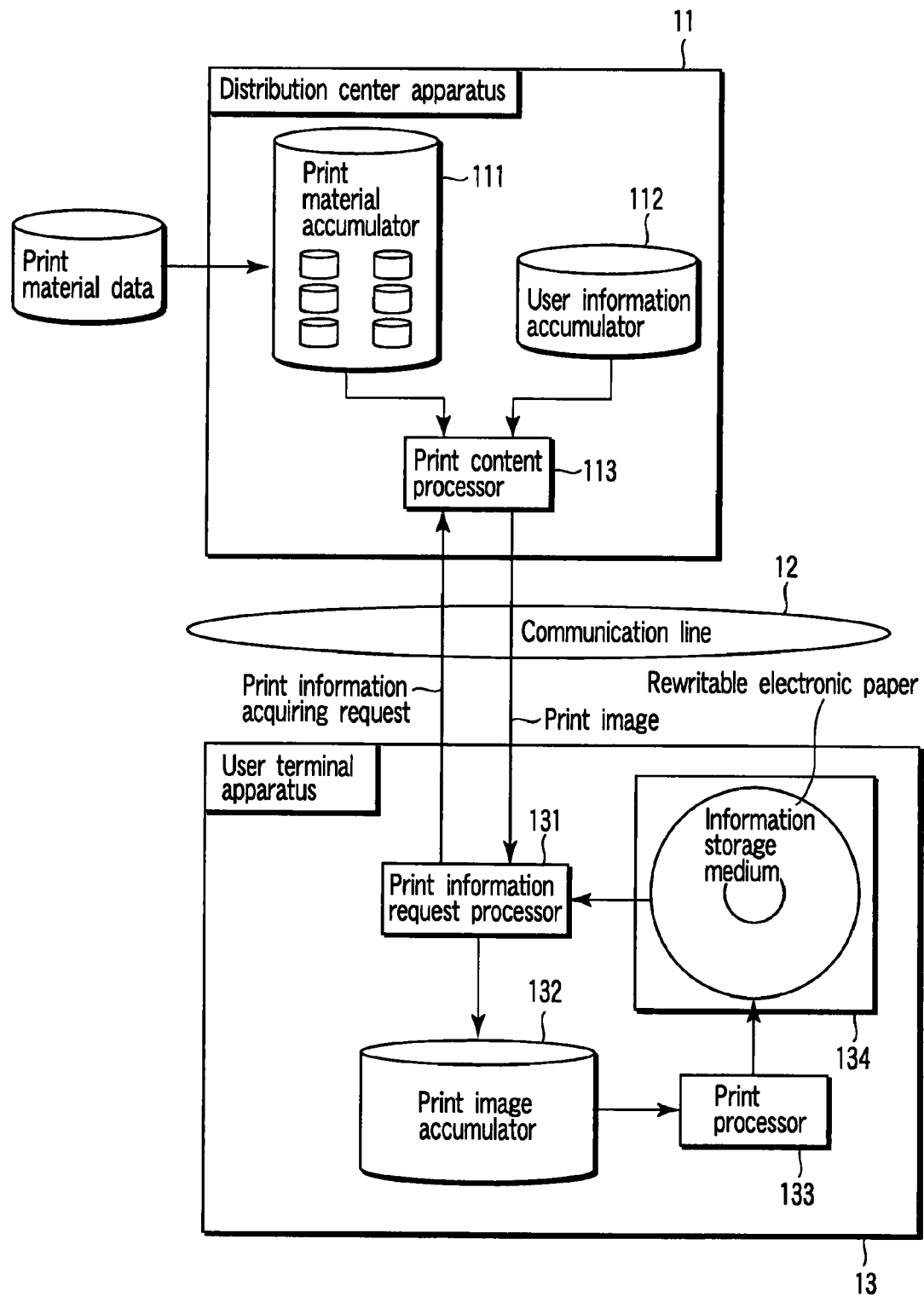
FIG. 1 is an exemplary block diagram illustrating a configuration of an information distribution system regarding the first embodiment of the present invention.

FIG. 1 is a block diagram depicting the first embodiment of an information distribution system of the invention. In the system shown in FIG. 1, a distribution center apparatus 11 is connected to a user terminal apparatus 13 via a communication line 12; the center apparatus 11 authenticates access from the terminal apparatus 13, and responds to a content request to distribute the corresponding content.

The system, of which the detail will not be described here, utilizes an information storage medium compatible with a CPRM to achieve a service to distribute a video content (refer to, for example, JP-A 2004-350150 [KOKAI], and JP-A 2005-159752 [KOKAI]). In this service, the center apparatus 11 encrypts, in advance, the video content to provide with a prescribed encryption key. When receiving a distribution request of the video content from the terminal apparatus 13, the service requires a medium ID recorded on the information storage medium compatible with the CPRM as well as distributes the encrypted video content to the terminal apparatus 13, and generates a key based on the medium ID to encrypt and provide the key itself used for encrypting video data.

In the meanwhile, the terminal apparatus 13 makes access to the center apparatus 11 to require the desired video content then receives the corresponding encrypted video content from the center apparatus 11. In viewing the video content, the user terminal apparatus 13 accesses to the center apparatus 11 in a state in which the storage medium is set to an internally or externally connected medium drive apparatus to transmit the medium ID together with the viewing request, receives the encryption key encrypted with the medium ID, decrypts the received encryption key by using the medium ID owned by the storage medium itself, and decrypts the encrypted content with the decrypted key.

Here, it is presumed that the system can download the video content to store it on a storage medium by the terminal apparatus 13, and it is supposed that the system may select either the purchase type capable of permanently viewing or the rental type capable of viewing within a time period limit like a commercially available DVD package by the user terminal apparatus 13. In this case, viewing the video content associated with the information storage medium through the use of the communication line needs presentation to the user on the management information, such as identification information and viewing time period of the video content capable of being viewed by means of the corresponding storage medium, and the transmission information on matters of attention and management for the distributed content.

In the system therefore the distribution center apparatus 11 provides print information corresponding to viewing conditions of the distributed video content to the user terminal apparatus 13 in response to the request from the terminal apparatus 13, and the terminal apparatus 13 can appropriately print the print information by a built-in or externally connected printer. A concrete configuration will be described in accordance with a schematic view of the entire system shown in FIG. 1.

The center apparatus 11 includes a print material accumulator 111, a user information accumulator 112, and a print content processor 113.

The material accumulator 111 registers print material data including a whole of or a part of title names, copyright possessors/managers, production dates, director names, performer names, capacities, hours, image qualities, sound qualities, adhesive terms and conditions, pair-rental information, barrier-free information (Braille), design/still image data, layout data corresponding to the contents. The center apparatus 11 manages the material data for printing corresponding to a plurality of contents by means of the material accumulator 111.

The user information accumulator 112 registers, as user information, a whole of or a part of user IDs, passwords, names, addresses, phone numbers, birth dates, sexes, content use histories, content information possible to acquire print information, conditions possible to acquire print information, print information acquiring histories, user terminal apparatus information, information on storage medium proper information, and content viewing limit information, information storage medium proper information (viewing time limit information for rental, etc.). The center apparatus 11 manages a plurality of items of user information by means of the user information accumulator 112.

The content processor 113 accepts a print information acquiring request from the terminal apparatus 13, refers to the data managed by the information accumulator 112 to authenticate the request, checks whether the request satisfies conditions enabling acquiring print information, acquires all or a part of items of the print material data satisfying the conditions from the material accumulator 11, and acquires a part of user information of system permission, such as content viewing limit information. The content processor 113 then creates a print image in which the print material data and the user individual data are put together to transmit it to the terminal apparatus 13.

On the other hand, the user terminal apparatus 13 comprises a print information request processor 131, a print image accumulator 132, a print processor 133, and a medium drive apparatus 134. The drive apparatus 134 is made as a composite type having a function to print an image on the label surface of the storage medium, and it is connected inside or outside the terminal apparatus 13. The information storage medium includes a storage portion which stores medium proper identification information and an outer portion which forms a print surface out of a rewritable material on its label surface.

When accepting the print request, the request processor 131 determines the printability and the type of printing (whether or not the material is rewritable one like electronic paper, etc.) of the information storage medium set in the drive apparatus 134, then, acquires medium proper identifier (medium ID) and content information stored in the storage medium from a read only area of the storage medium. The request processor 131 sets a whole or a part of user IDs, passwords, user terminal apparatus information, and information on storage medium proper information as the authentication information, adds the content information stored in the storage medium to accesses to the center apparatus 11, and issues the print information acquiring request thereto. The request processor 131 accepts the print image (material data for print, user individual data) transmitted from the center apparatus 11. At this moment, it is preferable to conduct a virus check, etc.

The image accumulator 132 stores the print image from the center apparatus 11 received by the request processor 131.

The print processor 133 acquires the print image from the image accumulator 132 managed in the terminal apparatus 13 to grasp a status (size, printable area) of the storage medium set in the drive apparatus 134 then presents the print image to the user if necessary, accepts a fine adjustment request to print the print image depending on the selection by the user, presents a sign of progress, and when completing the process, conducts processing to show the completion.

The drive apparatus 134 prints the print image from the print processor 133 into the print area of the storage medium in a state in which an information storage medium of which the label surface is formed as a rewritable print area (for example, a disk information storage medium, such as DVD-RW or DVD-RAM, or a card information storage medium such as a Secure Digital [SD] memory card) is set. A technique of electronic paper may be applied to form a rewritable print area.

Figure 2:
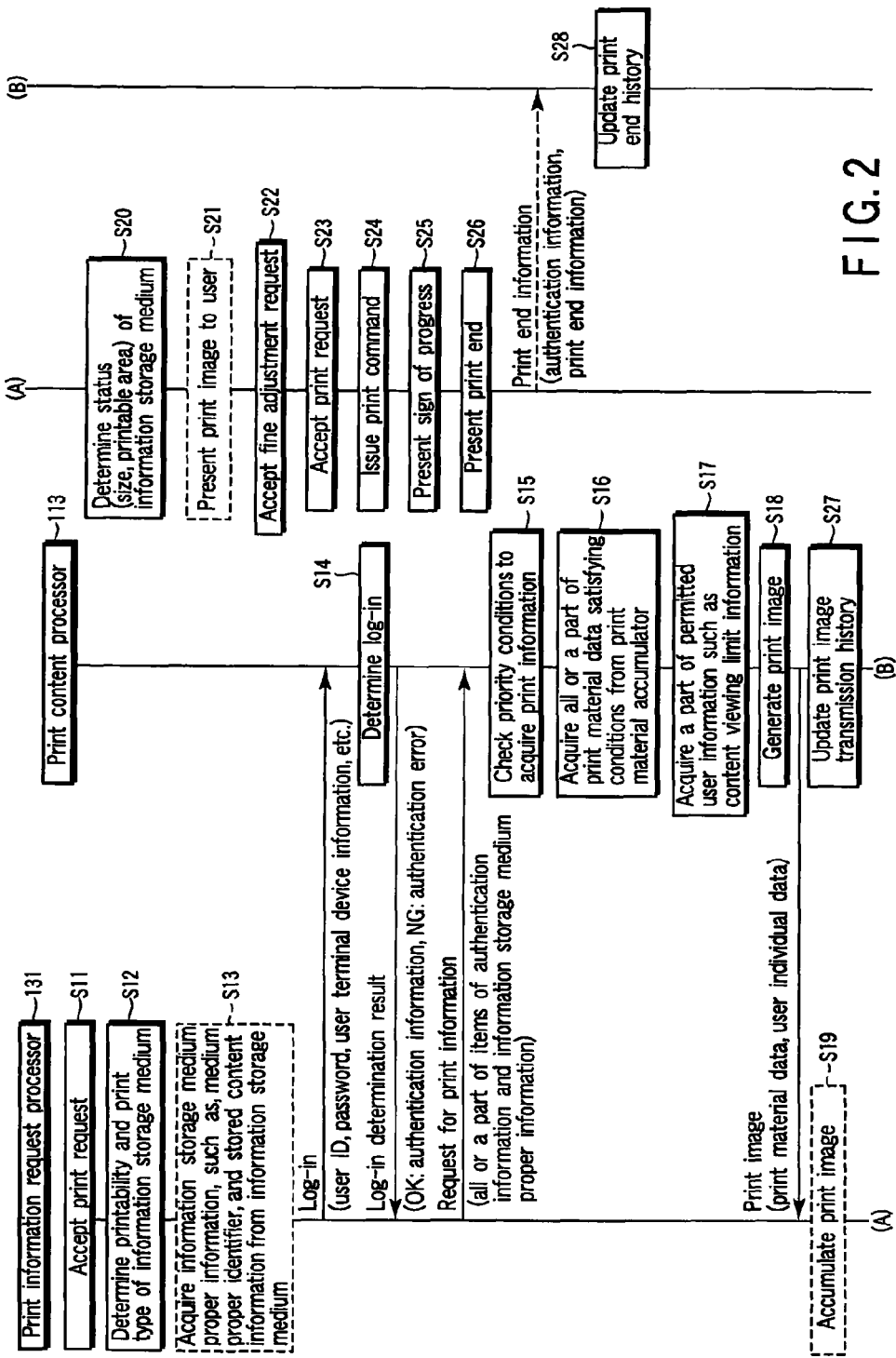
FIG. 2 is an exemplary sequence view illustrating a flow of processing of the information distribution system depicted in FIG. 1.

In the configuration given above, processing operations of the whole of the system will be set forth in the following description with reference to FIG. 2. FIG. 2 depicts a communication procedure between the print content processor 113 of the distribution center apparatus 11 and the print information request processor 131 of the user terminal apparatus 13.

When accepting the print request resulted from the input operation by the user (step S11), the request processor 131 of the user terminal apparatus 13 firstly determines the printability and the type of the printing of the set or connected information storage medium (S12). Then the request processor 131 acquires the information storage medium proper information, such as a medium proper identifier and existing content information from the storage medium (S13). In this state, the request processor 131 logs in the center apparatus 11 to present the user IDs, passwords, the user terminal apparatus information, etc.

In the meantime, when receiving the log-in information from the terminal apparatus 13, the printing content processor 113 on the side of the center apparatus 11 determines whether the user is an authorized one or not (S14), and notifies the log-in determination result (OK: authentication permission, NG: authentication error) to the terminal apparatus 13. Based on the log-in determination result, the request processor 131 transmits all or a part of items of the authentication information and the information storage medium proper information to the center apparatus 11.

On receiving the print information acquiring request, the content processor 113 checks the printability conditions to acquire the print information (S15), acquires all or a part of items of the print material data satisfying the conditions from the material accumulator 111 (S16), and acquires a part of the permitted user information (user individual data), such as content viewing limit information (S17). The content processor 113 then generates the print image from the print material data and the user individual data (S18) to transmit them to the user terminal apparatus 13 of the request source.

Meanwhile, on the side of the terminal apparatus 13, the request processor 131 accumulates the print image transmitted from the center apparatus 11 into the image accumulator 132 (S19). Here, the request processor 131 grasps the status (size, printable area) of the information storage medium set in the medium drive apparatus 134 (S20) to present the print image to the user (S21). At this moment, if the user watches the print image to input a request for fine adjustment (change in item or layout, etc.); the terminal apparatus 13 accepts the request for the fine adjustment to apply a correction resulting from the adjustment to the accumulated data (S22). When the print request is made (S23), the request processor 131 accepts it to issue the print command to the print processor 133 (S24). After issuing the print command, the request processor 131 receives the status information from the print unit 134 to present the sign of the progress (S25). The request processor 131 detects the print end from the status information to present it (S26), transmits the print end information (authentication information, print completion information) to the center apparatus 11, and terminates a series of processes.

On the other hand, on transmitting the print image to the user terminal apparatus 13, the print content processor 113 of the distribution center apparatus 11 updates its history (S27). When receiving the print end information from the terminal apparatus 13, the content processor 113 records the end of printing at a material providing destination in its history (S28), and ends a series of processes.

After checking in step S15, the content processor 113 may acquire only index data (introduction information) of the print material data satisfying the conditions from the print material accumulator 111, transmit it to the terminal apparatus 13 at the request source, receive the selection information based on the index data from the terminal apparatus 13, and reflect the print material data based on the selection information to the print image to transmit it to the terminal apparatus 13.

As mentioned above, in the foregoing embodiment, the information distribution system transmits the information on the information storage medium set in the user terminal apparatus 13 to the distribution center apparatus 11 via the communication line 12, checks between the pre-accumulated user information and the information on the information storage medium to specify the print material, generates the print image with the pre-accumulated print material data and the user individual data combined therein, and transmits it to the user terminal apparatus 13 via the communication line 12. The terminal apparatus 13 receives the print image to print the information on the printable surface of the information storage medium. At this time, as for an information storage medium, a medium, the printable surface of which is applied with material, such as a item of rewritable electronic paper, is used. Thereby, the storage medium may rewrite its content in response to the storage content in the storage medium, the situation of the user individual information, etc.

Therefore, according to the system with the aforementioned configuration, the content electronically distributed and stored in the information storage medium can be grasped visually, and the user's convenience can be dramatically improved in terms of medium management, information grasping from the distributor, etc.

In the given embodiment, the case in which one item of print material data is prepared for one distribution content having described, the present invention is not limited to this embodiment. For example, the distribution center apparatus 11 prepares a plurality of items of print material data to one item of distribution information data, and when the material data of the distribution information data is required from the user terminal apparatus 13, the center apparatus 11 presents the plurality of items of material data corresponding to the distribution information data to the user terminal apparatus 13 at the request source on the basis of the user individual management information and the medium proper identification information to make the user select the material data, generates the print image based on the selected material data to transmit it to the terminal apparatus 13. In the meanwhile, the terminal apparatus 13 requires the print material data to the center apparatus 11 for distributing the content, and when a plurality of items of print material data are presented in response to the request, the terminal apparatus 13 makes the user select any of the material data, and acquires the print image based on the user specified print material data from the distribution center apparatus 11 to print it on the label print surface of the information storage medium. Thereby, the user becomes possible to select print material matching with its preference.

As for another method, the aforementioned index data may be usable. That is, the center apparatus 11 includes a plurality of pieces of print material data and index data of each piece of the print material data for one item of distribution information data, and when the print material data of the distribution information data is required from the user terminal apparatus 13, the center apparatus 11 presents the index data of the plurality of items of print material data corresponding to the distribution information data to the user terminal apparatus 13 at the request origin, based on the user individual management information and the medium proper identification information. The center apparatus 11 then creates the print image based on the print material data corresponding to the index data specified from the terminal apparatus 13 to transmit it to the terminal apparatus 13. In this case, in distributing the content, the terminal apparatus 13 requires the print material data to the center apparatus 11 to present each index data of the plurality of items of print material data given for the request to the user. The terminal apparatus 13 requires the material data specified by the user among the pieces of the index data to the center apparatus 13, and prints the print image onto the label print surface of the information storage medium on the basis of the print material data transmitted from the center apparatus 13 in accordance with the request.

This method also makes it possible for the user to select the print material matching to its preference. More specifically, in comparison to the foregoing example, not transmitting the material data with a large file size to all user terminals apparatus 13 in advance, but transmitting the index data with extremely small in file size in comparison with the material data to the terminal apparatus 13, and transmitting only the print image based on the material data selected by the user, even if the communication is low in its speed, the method may sufficiently meet it and also may reduce the traffic of the communication line.

The embodiment given above having described the case in which the information storage medium compatible with the CPRM is used and the service to distribute the video content is achieved, the information storage medium corresponding to an Advanced Access Content System (AACS) aimed to the copyright protection of the next generation optical disk can be used for the service as well.

Second Embodiment

Figure 3:
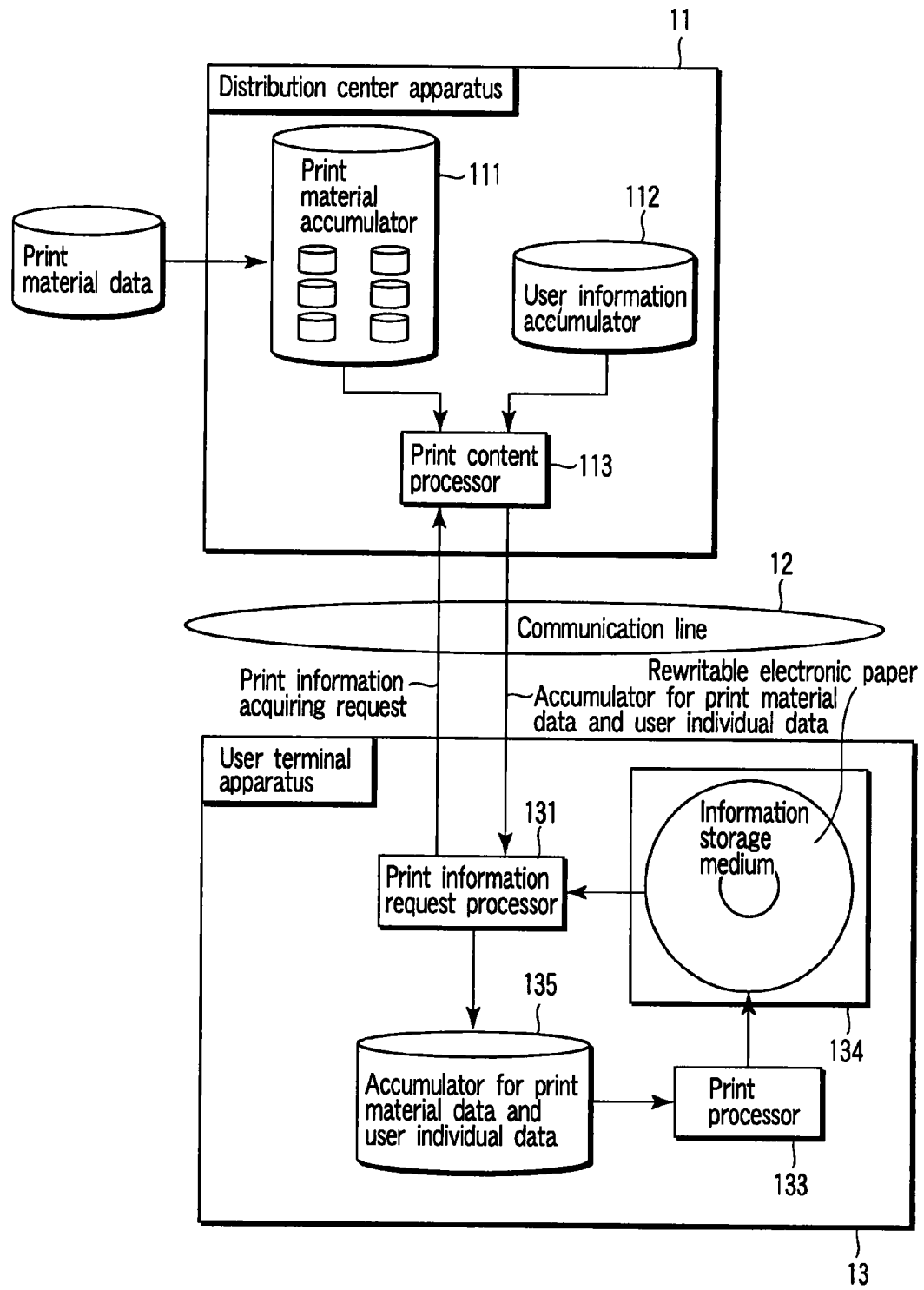
FIG. 3 is an exemplary block diagram illustrating a configuration of an information distribution system regarding the second embodiment of the invention.

FIG. 3 is a block diagram depicting the second embodiment in the information distribution system regarding the present invention, and FIG. 4 is a sequence view illustrating processing operations of the entire system of the second embodiment. The system being basically the same as that of the first embodiment, parts different from those of the first embodiment will be described hereinafter.

In this system, the side of the distribution center apparatus 11 does not generate the print image, but the side of the user terminal apparatus 13 generates it. Specifically, in the center apparatus 11, when accepting the print information acquiring request from the user terminal apparatus 13, the print content processor 113 transmits the print material data obtained from the print material accumulator 111 and the user individual data obtained from the user information accumulator 112 to the terminal apparatus 13. In the terminal apparatus 13, the request processor 131 receives the print material data and the user individual data transmitted from the center apparatus 11 to accumulate the data in an accumulator 135 for print material data and user individual data. The print processor 133 then obtains the print material data and the user individual data from the accumulator 135. In addition to grasp the status (size, printable area) of the information storage medium set in the medium drive apparatus 134, the print processor 133 generates the print image of the obtained data, presents the print image created if necessary to the user to accept the fine adjustment request, prints the print image by the selection of the user, presents the sign of the progress, and conducts processing to present the fact of the end when it comes to an end.

In the sequence view shown in FIG. 4, as a point dissimilar to FIG. 2, the distribution center apparatus 11 transmits the print material data and the user individual data to the user terminal apparatus 13 after the processing in step S17, and the user terminal apparatus 13 accumulates the print material data and the user individual data from the distribution center apparatus 11 into the accumulator 135 (S29). Here, after grasping the status of the information storage medium set in the drive apparatus 134 (S20), the terminal apparatus 13 reads the accumulated print material data and the user individual data from the accumulator 135, and generates the print image to present it to the user (S30). After this, the processing in the system of the second embodiment goes the same as that of the first embodiment. In the meantime, after transmitting the print material data and the user individual data, the center apparatus 11 updates the transmission history of the print material data (S32).

According to the configuration of the first embodiment, creating the print image on the side of the user terminal apparatus 13 enables freely editing the print image in an image most to the user's taste.

The embodiment given above having described the case in which one print material data is prepared for one distribution content, the present invention is not limited to the embodiment. For instance, the distribution center apparatus 11 includes a plurality of items of print material data for one distribution information data, and when the print material data for the distribution information data is required from the user terminal apparatus 13, the center apparatus 11 provides a plurality of pieces of print material data corresponding to the distribution information data on the basis of the user individual management information and the medium proper identification information. Meanwhile, for distributing the content, the terminal apparatus 13 requires the print material data to the center apparatus 11, and when a plurality of items of print material data is provided in response to the request, the terminal apparatus 13 prints the user specified print material data onto the label print surface of the information storage medium. Thereby, the user becomes possible to select any print material matching to its preference.

As for another method, using the index data given above is a possible approach. That is to say, the center apparatus 11 is provided with a plurality of items of print material data and each index data of the print material data for one item of distribution information data, and when the print material data of the distribution information data is required from the user terminal apparatus 13, the center apparatus 11 provides the index data of the plurality of pieces of print material data corresponding to the distribution information data to the user terminal apparatus 13 located at the request source on the basis of the user individual management information and the medium proper identification information. The center apparatus 11 then transmits the print material data corresponding to the index data specified from the user terminal apparatus 13. In such a case, the terminal apparatus 13 requires the print material data to the center apparatus 11 for the content distribution, and presents each index data of the plurality of pieces of print material data supplied for the request to the user. The terminal apparatus 13 then requires the print material data specified by the user among the index data to the center apparatus 13, and prints the print material data transmitted in accordance with the request on the label print surface of the information storage medium.

Such a method also enables selecting the print materials matched with the preference of the user. Especially, in comparison to the above mentioned example, not having transmitted all pieces of the material data with large in file size to the terminal apparatus 13 in advance, but having transmitted the index data with extremely small in size in comparison to the material data to the terminal apparatus 13, and having transmitted only the material data selected by the user, even the communication line having a low speed may sufficiently correspond, and also may decrease the traffic on the communication line.

The given embodiment also having described the system which achieves the service to distribute the video content by using the information storage medium corresponding to the CPRM, the use of the information storage medium corresponding to the AACS aimed to the copyright protection of the next generation optical disk is also available in a similar manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information distribution system which distributes information data to a user terminal apparatus from a distribution center apparatus via a communication line, wherein the distribution center apparatus separately manages to each store information data encrypted with a prescribed key and the key in advance, distributes information data required from the user terminal apparatus in an encrypted state, requires to the user terminal apparatus to present medium proper identification information stored in an information storage medium having proper identification information, and encrypts to distribute the key itself used for encrypting the information data by using the medium proper identification information presented in response to the request, and the distribution center apparatus comprises:

a user management unit which generates and registers user individual management information including use conditions of distributed information data by associating it with user information registered in advance;

a material data accumulator which accumulates material data to print information related to the information data onto a label print surface of the information storage medium;

a request accepting unit which accepts a request for print information for the distributed information data to be transmitted from the user terminal apparatus together with the medium proper identification information;

an image generation unit which reads the user individual management information from the user management unit as well as reads the corresponding material data from the material data accumulator in accepting the request for the print information to generate a print image in a prescribed form; and a transmitting unit which transmits the print image to the user terminal apparatus at a request source of the print information, and wherein the user terminal apparatus decrypts an encrypted key received from the distribution center apparatus by using the medium proper identification information presented to the distribution center apparatus, and decrypts the encryption of the distributed information data with the decrypted key, and the user terminal apparatus comprises:

a communication unit which transmits, to the distribution center apparatus, the request for the print information of the distributed information data together with the medium proper identification information, and receives the print image to be transmitted from the distribution center apparatus;

an accumulator which accumulates the print image received by the communication unit; and a print unit which prints the print image onto a label print surface of the information storage medium.

2. The information distribution system according to claim 1, wherein:
the label print surface of the information storage medium is formed of a rewritable material; and
the print unit rewrites a print content by overwriting the print image on the information storage medium.

3. The information distribution system according to claim 1, wherein:
the material data accumulator includes a plurality of pieces of print material data to one piece of distribution information data;
the print image generation unit transmits contents of the plurality of pieces of print material data corresponding to the distributed information data to the user terminal apparatus at the request source on the basis of the print information required from the user terminal apparatus to make the user terminal apparatus select any one of the contents, and generates the print image by using the selected print material data; and
when the contents of the plurality of pieces of print material data are transmitted from the distribution center apparatus in response to the transmission of the request for the print information, the communication unit presents the contents to accept the selection by a user, and notifies the selection result to the distribution center apparatus.

4. The information distribution system according to claim 1, wherein:
the material data accumulator includes a plurality of pieces of material data and each index data thereof for one piece of the distribution information data;
the print image generation unit transmits each index data of the plurality of pieces of material data corresponding to the distributed information data to the user terminal apparatus at the request source on the basis of the print information required from the user terminal apparatus to make the user terminal apparatus select any one piece of the index data, and generates the print image by using the material data corresponding to the selected index data; and
when the index data of the plurality of pieces of material data are transmitted from the distribution center apparatus in response to the transmission of the request for the print information, the communication unit presents the contents of each piece of the index data to accept the selection by a user, and notifies the selection result to the distribution center apparatus.

5. An information distribution system which distributes information data to a user terminal apparatus from a distribution center apparatus via a communication line, wherein
the distribution center apparatus separately manages to each store information data encrypted with a prescribed key and the key in advance, distributes information data required from the user terminal apparatus in an encrypted state, requires to the user terminal apparatus to present medium proper identification information stored in an information storage medium having proper identification information, and encrypts to distribute the key itself used for encrypting the information data by using the medium proper identification information presented in response to the request, and the distribution center apparatus comprises:
a user management unit which generates and registers user individual management information including use conditions of distributed information data by associating it with user information registered in advance;
a material data accumulator which accumulates material data to print information related to the information data onto a label print surface of the information storage medium;
a request accepting unit which accepts a request for print information for the distributed information data to be transmitted from the user terminal apparatus together with the medium proper identification information; and
a transmitting unit which reads user individual management information from the user management unit as well as reads the corresponding material data from the material data accumulator in accepting the request for the print information to each transmit them to the user terminal apparatus at the request source; wherein:
the user terminal apparatus decrypts an encrypted key received from the distribution center apparatus by using the medium proper identification information presented to the distribution center apparatus, and decrypts the encryption of the distributed information data with the decrypted key, and the user terminal apparatus comprises:
a communication unit which transmits, to the distribution center apparatus, the request for the print information of the distributed information data together with the medium proper identification information, and receives the material data and the user individual management information to be transmitted from the distribution center apparatus;
an accumulator which accumulates the material data and the user individual management information print image received by the communication unit by associating them with the distributed information data;
a print image generation unit which reads the material data and the user individual management information corresponding to the distributed information data from the accumulator to generate the print image in a prescribed form; and
a print unit which prints the print image onto a label print surface of the information storage medium with the distributed information data stored thereon.

6. The information distribution system according to claim 5, wherein:
the label print surface of the information storage medium is formed of a rewritable material; and
the print unit rewrites a print content by overwriting the print image on the information storage medium.

7. The information distribution system according to claim 5, wherein:
the material data accumulator includes a plurality of items of material data for one item of distribution information data;
the transmitting unit reads the corresponding plurality of items of material data from the material data accumulator in accepting the request for the print information to transmit them to the user terminal apparatus at the request source;
the communication unit receives a plurality of items of material data transmitted from the distribution center apparatus;
the accumulator accumulates the plurality of items of material data received by the communication unit by associating them with the distributed information data; and the print image generation unit reads material data specified by a user among a plurality of items of material data corresponding to the distributed information data together with the user individual management information from the accumulator to generate the print image in the prescribed form.

8. The information distribution system according to claim 5, wherein:
the material data accumulator includes a plurality of items of material data and index data corresponding to each item of the material data for one distribution data;
the transmitting unit reads index data each corresponding to the plurality of items of material data from the material data accumulator in accepting the request for the print information, notifies them to the user terminal apparatus at the request source to make the user terminal apparatus select any one item of the index data, and transmits only the material data corresponding to the selected index data to the user terminal apparatus at the request source; and
when receiving the index data of the plurality of material data transmitted from the distribution center apparatus, the communication unit presents contents of each item of the index data to accept the selection by a user, notifies the selection result to the distribution center apparatus, and receives the material data corresponding to the selected index data to be transmitted from the distribution center apparatus.

9. A distribution center apparatus, in an information distribution system distributing information data to a user terminal apparatus via a communication line, which individually manages to each store information data encrypted with a prescribed key and the key in advance, distributes information data required from the user terminal apparatus in an encrypted state, requires to present medium proper identification information stored on an information storage medium having proper identification information to the user terminal apparatus, encrypts to distribute the key itself used for encrypting the information data by using the medium proper identification information presented in response to the request, decrypts the encrypted key by using the medium proper identification information on a side of the user terminal apparatus, and decrypts the encryption of the distributed information data with the decrypted key, the distribution center apparatus comprising:
a user management unit which generates to register user individual management information including use conditions of the distributed information data by associating the management information with the user information to be registered in advance;
a material data accumulator which accumulates material data to print information related to the information data onto a label print surface of the information storage medium;
a request accepting unit which accepts a request for print information of the distributed information data to be transmitted from the user terminal apparatus together with the medium proper identification information;
a print image generation unit which reads the user individual management information from the user management unit as well as reads the corresponding material data from the material data accumulator in accepting the request for the print information to generate a print image in a prescribed form; and
a transmitting unit which transmits the print image to the user terminal apparatus at the request source of the print information.

10. A distribution center apparatus, in an information distribution system distributing information data to a user terminal apparatus via a communication line individually, which individually manages to each store information data encrypted with a prescribed key and the key in advance, distributes information data required from the user terminal apparatus in an encrypted state, requires to present medium proper identification information stored on an information storage medium having proper identification information to the user terminal apparatus, encrypts to distribute the key itself used for encrypting the information data by using the medium proper identification information presented in response to the request, decrypts the encrypted key by using the medium proper identification information on a side of the user terminal apparatus, and decrypts the encryption of the distributed information data with the decrypted key, the distribution center apparatus comprising:
a user management unit which generates to register user individual management information including use conditions of the distributed information data by associating the management information with the user information to be registered in advance;
a material data accumulator which accumulates material data to print information related to the information data onto a label print surface of the information storage medium;
a request accepting unit which accepts a request for print information of the distributed information data transmitted from the user terminal apparatus together with the medium proper identification information; and
a transmitting unit which reads the user individual management information from the user management unit as well as reads the corresponding material data from the material, data accumulator in accepting the request for the print information to transmit them to the user terminal apparatus at the request source.

11. A user terminal apparatus of an information distribution system which receives information data distributed from a distribution center apparatus via a communication line, wherein
the distribution center apparatus individually manages information data encrypted with a prescribed key and the key to each store them in advance, distributes information data required from the user terminal apparatus in an encrypted state, requires to a distribution destination to present medium proper identification information stored in an information storage medium having proper identification information, and when encrypting to distribute the key itself used for the encryption of the information data by using the medium proper identification information presented in response to the request, decrypts the encrypted key received from the distribution center apparatus by using the medium proper identification information presented to the distribution center apparatus, and decrypts the encryption of the distributed information data with the decrypted key, the information distribution system decrypts the encrypted key received from the distribution center apparatus by using the medium proper identification information presented to the distribution center apparatus, and decrypts the encryption of the distributed information data with the decrypted key, and when the distribution center apparatus generates to register user individual management information including use conditions of the distributed information data and accumulates material data to print information related to the information data onto a label print surface of the medium proper storage medium by associating the management information with the user information to be registered in advance, accepts the request for the print information of the distributed information data transmitted together with the medium proper identification information, reads the material data and the user proper management information to be required in accepting the request for the print information, and generates the print image in a prescribed form to transmit it to the user terminal apparatus at the request source of the print information, the user terminal apparatus comprises:
- a communication unit which transmits, to the distribution center apparatus, the request for the print information of the distributed information data together with the medium proper identification information, and receives a print image to be transmitted from the distribution center apparatus;
- an accumulator which accumulates the print image received by the communication unit; and
- a print unit which prints the print image onto a label print surface of the information storage medium.

12. The user terminal apparatus according to claim 11, wherein:
the label print surface of the information storage medium is formed of a rewritable material; and
the print unit rewrites a print content by overwriting a print image on the information storage medium.

13. The user terminal apparatus according to claim 11, wherein:
the distribution center apparatus includes a plurality of items of print material data for one item of distribution information data, and when the distribution center apparatus makes a request source to select the plurality of items of print material data corresponding to the distributed information data and generates to distribute the print image by using the selected print material data;
the communication unit presents the contents to accept the selection by a user, and notifies the selection result to the distribution center apparatus when contents of the plurality of items of print material data are transmitted from the distribution center apparatus in response to the transmission of the request for the print information.

14. The user terminal apparatus according to claim 11, wherein:
the distribution center apparatus includes the plurality of items of material data and each index data thereof for one item of distribution information data, and when the distribution center apparatus distributes the index data to the request source to make the request source select any one of the plurality of items of index data and generates to distribute the print image by using the material data corresponding to the selected index data in requiring the print information;
the communication unit presents the contents of the index data to accept the selection by a user when the index data of the plurality of items of material data is transmitted from the distribution center apparatus in response to the transmission of the request for the print information, and notifies the selection result to the distribution center apparatus.

15. A user terminal apparatus of an information distribution system which receives information data distributed from a distribution center apparatus via a communication line, wherein
the distribution center apparatus of the information distribution system separately manages to each store information data encrypted with a prescribed key and the key in advance, when the distribution center apparatus distributes information data required from the user terminal apparatus in an encrypted state, requires to a distribution destination to present medium proper identification information stored in an information storage medium having proper identification information, and encrypts to distribute the key itself used for encrypting the information data by using the medium proper identification information presented in response to the request, the information distribution system decrypts the encrypted key received from the distribution center apparatus by using the medium proper identification information presented to the distribution center apparatus, and decrypts the encryption of the distributed information data with the decrypted key, and when the distribution center apparatus generates to register user individual management information including use conditions of the distributed information data and accumulates material data to print information related to the information data onto a label print surface of the information storage medium in advance, accepts a request for print information of the distributed information data to be transmitted together with the medium proper identification information, reads the material data and the user individual management information in accepting the request for the print information to transmit them to the user terminal apparatus at the request source, the user terminal apparatus comprises:
- a communication unit which transmits, to the distribution center apparatus, the request for the print information of the distributed information data together with the medium proper identification information, and receives material data and user individual management information transmitted from the distribution center apparatus;
- an accumulator which accumulates the material data and the user individual management information received by the communication unit by associating them with the distributed information data;
- a print image generation unit which reads the material data and the user individual management information corresponding to the distributed information data from the accumulator to generate print image in a prescribed form; and
- a print unit which prints the print image onto a label print surface of the information storage medium with the distributed information data stored thereon.

16. The information distribution system according to claim 15, wherein:
the label print surface of the information storage medium is formed of a rewritable material; and
the print unit rewrites a print content by overwriting the print image on the information storage medium.

17. The information distribution system according to claim 15, wherein, when the distribution center apparatus includes a plurality of items of material data for one item of distribution information data, and reads the corresponding plurality of items of material data to transmit them to the request source in accepting the request for the print information,
the communication unit receives the plurality of items of material data transmitted from the distribution center apparatus;
the accumulator accumulates the plurality of items of material data received by the communication unit by associating them with the distributed information data; and the print image generation unit reads material data specified by a user together with the user individual management information among a plurality of items of material data corresponding to the distributed distribution information data to generate a print image in a prescribed form.

18. The information distribution system according to claim 15, wherein, when the distribution center apparatus includes a plurality of items of material data and index data corresponding to each material data for one item of distribution information data, reads index data corresponding to each of the plurality of items of material data in accepting the request for the print information, notifies the index data to the request source to make it select any one item of the index data, and transmits only the material data corresponding to the selected index data to the request source, the communication unit presents contents of each index data to accept the selection by a user when receiving the index data of the plurality of items of material data transmitted from the distribution center apparatus, notifies the selection result to the distribution center apparatus, and receives the material data corresponding to the selected index data transmitted from the distribution center apparatus.

* * * * *